2,877,207
POLYMERS OF FLUORINATED ACRYLIC MONOMERS

Robert P. Cox and Luther L. Yaeger, Madison, Wis., assignors to Bjorksten Research Laboratories, Inc., Fitchburg, Wis., a corporation of Illinois No Drawing. Application January 13, 1956
Serial No. 558,829

6 Claims. (Cl. 260—45.5)

This invention relates to polymers and copolymers of fluorinated esters of acrylic and methacrylic acids.

For the purpose of accurately describing and claiming this invention the term "polymer" will be used to mean "homopolymer, copolymer or terpolymer" in accordance with the practice of Schmidt and Marlies "Principles of High-Polymer Theory and Practice," McGraw-Hill, 1948, first edition, page 15, who state therein that "the polymerization of two or more units, each of which is independently capable of polymerization, into the same chains is the process called polymerization."

Materials made according to this invention are tough, elastomeric or rigid, more or less transparent materials having extremely high heat resistance, especially suitable for application in laminates for glazing in high-speed aircraft which develop high skin temperatures.

Therefore, an object of the invention is a polymer of a substance having the formula:

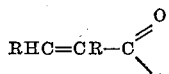

wherein R is a radical selected from the group consisting of H, $CH_3$ and halogen and $R_1$ is a fluorinated alkyl or aryl radical; copolymerized with a substance adapted to undergo vinyl polymerization or with a substance adapted to be cross-linked by a compound adapted to undergo vinyl polymerization.

Another object is a compound having the said formula, copolymerized with a multihydric alcohol and a multicarboxylic acid to cross-link the resultant polyester.

Another object is a coplymer adapted to be transparent and at the same time resist high temperatures.

Further objects will become apparent from the description in which it is our intention to illustrate the applicability of the invention without thereby intending to limit its scope to less than that of all equivalents which will be apparent to those skilled in the art.

The following examples illustrate the applicability of the invention.

EXAMPLE 1

*Preparation of 1,1-dihydroperfluorobutyl acrylate*

A 2:1 molar ratio of benzoyl chloride and acrylic acid (stabilized against premature polymerization with methylene blue) was heated to boiling in a round-bottomed flask fitted with a Vigreaux fractionating column. The distillate boiling up to 85° C. was collected rather rapidly in a receiver cooled in an ice bath. The product, acrylyl chloride, was redistilled through the same column; the fraction boiling in the range 72–73° C. at atmospheric pressure was collected and represented a theoretical yield of 72%.

Acrylyl chloride, 54 grams (0.6 mole), prepared in the above manner was added to 100 grams 1,1-dihydroperfluorobutanol (Minnesota Mining & Mfg. Co.) containing 0.5 gram of hydroquinone. The reaction mixture was cooled for a few minutes in an ice bath, but no exothermic reaction took place. The reaction mixture was then heated slowly to 86° C. over a period of 2 hours and 20 minutes. After cooling, the reaction mixture was poured into cold water and aqueous 5% $NaHCO_3$ solution added to neutralize any remaining acid or acid chloride. The water insoluble layer was separated and dried over anhydrous potassium carbonate.

The ester was distilled under reduced pressure, the fraction boiling over the range 39–43° C. at 35–40 mm. being collected. The refractive index of the synthesized material was 1.3269/22–23° C. (literature value is 1.3299/20° C.). The prepared ester also reacted positively to the ferric hydroxamate ester test, the bromine in carbon tetrachloride unsaturation test, and the aqueous potassium permanganate unsaturation test.

Preparation of polymers

A number of polymers were prepared from this monomeric ester. Their methods of preparation are identified by their sample numbers.

(a) *Samples KA–465 and KA–471.*—An ethyl acrylate prepolymer was prepared by irradiating 50 ml. of monomer plus 1 drop of diacetyl (in a $CO_2$ atmosphere) with a 500 watt ultraviolet lamp. The viscosity of the final syrup was 600 centipoises @ 25° C. To this syrup was added 1% vinyl polysiloxane and various amounts of 1,1-dihydroperfluorobutyl acrylate monomer. The solution was then placed in glass tubes and exposed to ultraviolet light (General Electric 275 watt "Sunlamp" placed 3 feet from samples).

(b) *Samples KA–470 and KA–472.*—Ethyl acrylate and diacetyl (1 drop per 50 ml. monomers) and 1,1-dihydroperfluorobutyl acrylate were introduced into a 3-necked flask equipped with a reflux condenser, stirrer, and $CO_2$ inlet tube. The mixture was irradiated by a 500 watt ultraviolet lamp and thus polymerized.

For sample KA–470, 1% of vinyl polysiloxane was added, and for KA–472, 2%. The final viscosities at 25° C. were 300 and 2700 centipoises respectively.

Properties of Polymers

The solvent and thermal resistances of some of these polymers are shown in Table No. 1.

TABLE NO. 1.—PROPERTIES OF SILOXANE-ACRYLATE POLYMERS

| Sample: | | Percent Swelling (in 70-30 white gas-toluene) | Percent Swelling (in dioctyl sefacate) | Percent Weight Loss (after 24 hours @ 350° F.) |
|---|---|---|---|---|
| KA-470A | 1,1-dihydroperfluorobutyl acrylate (25); ethyl acrylate (25); diacetyl (1 drop); vinyl polysiloxane (1/2). | 0 | 19.7 | 14.7 |
| KA-470B | 1,1-dihydroperfluorobutyl acrylate (12.5); ethyl acrylate (37.5); diacetyl (1 drop); vinyl polysiloxane (1/2). | 16 | 50 | 11.6 |
| KA-471 | Ethyl acrylate prepolymer (27); 1,1-dihydroperfluorobutyl acrylate (3); vinyl polysiloxane (0.3); diacetyl (3/5 drop by aliquot). | 13 | 50 | 26.6 |
| KA-472 | 1,1-dihydroperfluorobutyl acrylate (12.5); ethyl acrylate (37.5); diacetyl (1 drop); diacetyl (1 drop); vinyl polysiloxane (1). | 27 | 38.3 | 10.3 |
| KA-465A | Ethyl acrylate prepolymer (100); diacetyl (2 drops); vinyl polysiloxane (1). | 7 | | |
| KA-465B | Ethyl acrylate prepolymer (93.5); 1,1-dihydroperfluorobutyl acrylate (6.4); diacetyl (2 drops); vinyl polysiloxane (1). | 19 | | |
| KA-465C | Ethyl acrylate prepolymer (87.5); 1,1-dihydroperfluorobutyl acrylate (12.5); diacetyl (2 drops); vinyl polysiloxane (1). | 24 | | |
| KA-465D | Ethyl acrylate prepolymer (75); 1,1-dihydroperfluorobutyl acrylate (25); diacetyl (2 drops); vinyl polysiloxane (1). | 24 | | |

EXAMPLE 2

Polymers with a high silicon content may be prepared with fluorinated esters as cross-linkers for linear or long chain cyclic silicon containing elastomers such as the crosslinked copolymers of vinyl polysiloxane having the formula:

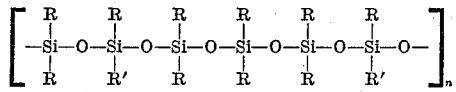

wherein R is a radical selected from the group consisting of phenyl and methyl and R' is the vinyl group and $n$ is an integer greater than one and 1,1-dihydroperfluorobutyl acrylate.

In the same manner an unsaturated polyester resin may be cross-linked with a fluoroalkyl or aryl ester of acrylic or methacrylic acid in place of the usual styrene.

Following this line of reasoning, clear, hard solid resins were obtained as follows:

Equal parts of vinyl phenyl dichlorosilane and dioxane were mixed and stirred into five parts of crushed ice and water. After the mixture had settled, the water phase was decanted and the silanol oil concentrated by evaporation of the dioxane. No separation of the oil was attempted but the mixture was polymerized to the viscosity of commercial polyester resins by heating for 6–8 hours at about 210° C. under nitrogen. 1% triethanolamine did not accelerate the oil's condensation; 1% sulfuric acid darkened it excessively; but phosphorus pentoxide accelerated the condensation and reduced the time to 2 hours without affecting color or clarity.

Two parts of the syrupy siloxane polymer are mixed with either one part of trifluoroethyl acrylate, or of methyl acrylate, or of vinyl acetate. After being catalyzed with 0.7% acetyl peroxide and sealed in glass vials, the mixtures were held at 80° C. for 48 hours. Tough tear-resistant polymers were formed.

The homopolymer from the polysilanol under similar conditions but without the addition of monomers, is soft and tacky, indicating a pronounced increase in reactivity resulting from the presence of the monomers.

The hydrolysis, condensation and copolymerization may be repeated with half of the vinyl phenyl dichlorosilane replaced with dimethyl dichlorosilane. Similar resins are obtained with no increase in flexibility.

Only certain monomers and reactions have been disclosed in the examples. These are not to be taken as limiting, as equivalents will be apparent to those skilled in the art.

Various polymerizable organic compounds which are characterized by the presence of a polymerizable unsaturated group may be employed in the practice of the present invention. For example, the following are suitable: vinyl fluoride, vinylidene fluoride, fluoro-ethyl methacrylate, fluoro-n-propyl methacrylate, fluoro-iso-propylmethacrylate, fluoro-n-butyl methacrylate, fluoro-iso-butyl methacrylate, fluoro-cyclohexyl methacrylate, fluoro-methyl acrylate, fluoro-ethyl acrylate, fluoro-n-propyl acrylate, fluoro-iso-propyl acrylate, fluoro-n-butyl acrylate, fluoro-iso-butyl acrylate, fluoro-cyclohexyl acrylate, fluoro-methyl alpha-chloroacrylate, fluoro-ethyl alpha-chloroacrylate, fluoro - n - propyl alpha - chloroacrylate, fluoro-iso-propyl aypha-chloroacrylate, fluoro-n-propyl alpha-chloroacrylate, fluoro-iso-butyl alpha-chloroacrylate, fluoro-cyclohexyl alpha-chloroacrylate, fluoro-vinyl methacrylate, fluoro-vinyl acrylate, fluoro-vinyl alpha-chloroacrylate, fluoro-allyl acrylate, fluoro-allyl methacrylate, fluoro-allyl alpha-chloroacrylate, fluoro-beta methyllal acrylate, fluoro-beta-methylallyl methacrylate, fluoro-beta-methylallyl alpha-chloroacrylate and the like.

Having thus disclosed our invention, we claim:

1. A polymeric synthetic resin comprising

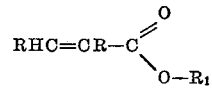

wherein R is a radical selected from the group consisting of H, $CH_3$ and halogen and $R_1$ is a radical selected from the group consisting of a fluoroalkyl radical having two hydrogen atoms attached to the carbon atom in the 1-position thereof copolymerized with a compound selected from the group consisting of esters of acrylic and methacrylic acid, and with from 1% to about 2% vinyl polysiloxane, said 1% to said 2% being based on the sum of fluoroalkyl ester and acrylic ester, said vinyl polysiloxane having the formula:

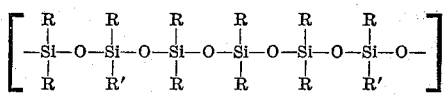

wherein R is a radical selected from the group consisting of phenyl and methyl and R' is the vinyl group and $n$ is an integer greater than one.

2. A synthetic resin according to the formula: about 1% to about 2%

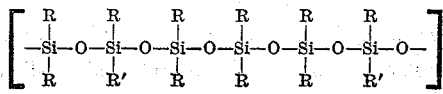

wherein R is a radical selected from the group consisting of phenyl and methyl and R' is the vinyl group, and n is an integer greater than one, copolymerized with a fluoroalkyl acrylate wherein two hydrogen atoms are attached to the number 1 carbon atom of the fluoroalkyl radical of the fluoroalkyl acrylate and with a compound seletced from the group consisting of esters of acrylic and methacrylic acid, said 1% to said 2% being based on the sum of fluoroalkyl ester and acrylic ester.

3. A polymeric synthetic resin comprising 1,1-dihydroperfluorobutylacrylate copolymerized with a compound selected from the group consisting of esters of acrylic and methacrylic acid and with from 1% to about 2% vinyl polysiloxane having the formula:

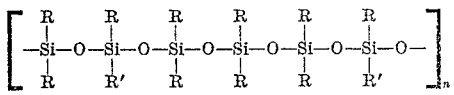

wherein R is a radical selected from the group consisting of phenyl and methyl and R' is the vinyl group and n is an integer greater than one, said 1% to about 2% being based on the sum of fluoroalkyl ester and acrylic ester.

4. A polymeric synthetic resin comprising trifluoroethylacrylate copolymerized with a compound selected from the group consisting of esters of acrylic and methacrylic acid and with from about 1% to about 2% vinyl polysiloxane, said acrylate having one carbon of the fluoroethyl radical attached to two hydrogen atoms, and said polysiloxane having the formula:

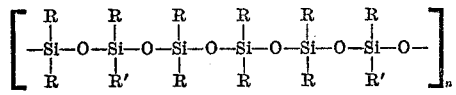

wherein R is a radical selected from the group consisting of phenyl and methyl and R' is the vinyl group, and n is an integer greater than one, said 1% to about 2% being based on the sum of fluoroalkyl ester and acrylic ester.

5. A polymeric synthetic resin comprising 1,1-dihydroperfluorobutylacrylate copolymerized with ethyl acrylate and with from 1% to about 2% vinyl polysiloxane having the formula:

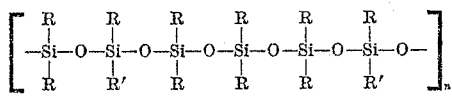

wherein R is a radical selected from the group consisting of phenyl and methyl and R' is the vinyl group and n is an integer greater than one, said 1% to about 2% being based on the sum of 1,1-dihydroperfluorobutylacrylate and ethyl acrylate.

6. A polymeric synthetic resin comprising trifluoroethyl acrylate wherein two hydrogen atoms are attached to the number 1 carbon atom of the trifluoroethyl radical of the trifluoroethyl acrylate copolymerized with ethyl acrylate and with from about 1% to about 2% vinyl polysiloxane, said polysiloxane having the formula:

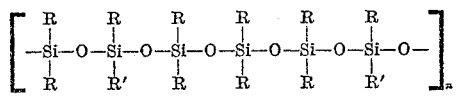

wherein R is a radical selected from the group consisting of phenyl and methyl and R' is the vinyl group, and n is an integer greater than one, said 1% to about 2% being based on the sum of trifluoroethylacrylate and said ethyl acrylate.

References Cited in the file of this patent
UNITED STATES PATENTS

| | | |
|---|---|---|
| 2,420,911 | Roedel | May 20, 1947 |
| 2,628,958 | Bittles | Feb. 17, 1953 |
| 2,642,416 | Ahlbrecht et al. | June 16, 1953 |